(12) United States Patent
Cheng et al.

(10) Patent No.: US 11,474,709 B2
(45) Date of Patent: *Oct. 18, 2022

(54) MANAGING DATA FOR A DATA STORAGE SYSTEM

(71) Applicant: Western Digital Technologies, Inc., San Jose, CA (US)

(72) Inventors: Kai-Lung Cheng, Irvine, CA (US); Yun-Tzuo Lai, Irvine, CA (US); Eugene Lisitsyn, Anaheim, CA (US); Jerry Lo, Hacienda Heights, CA (US); Subhash Balakrishna Pillai, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 17/153,713

(22) Filed: Jan. 20, 2021

(65) Prior Publication Data

US 2021/0141542 A1     May 13, 2021

Related U.S. Application Data

(63) Continuation of application No. 16/523,956, filed on Jul. 26, 2019, now Pat. No. 10,901,632, which is a continuation of application No. 15/664,667, filed on Jul. 31, 2017, now Pat. No. 10,379,758.

(60) Provisional application No. 62/525,128, filed on Jun. 26, 2017.

(51) Int. Cl.
*G06F 3/06* (2006.01)
*G06F 12/02* (2006.01)

(52) U.S. Cl.
CPC ............ *G06F 3/0619* (2013.01); *G06F 3/064* (2013.01); *G06F 3/065* (2013.01); *G06F 3/0679* (2013.01); *G06F 12/0246* (2013.01); *G06F 12/0253* (2013.01); *G06F 2212/7201* (2013.01);
(Continued)

(58) Field of Classification Search
None
See application file for complete search history.

(56) References Cited

U.S. PATENT DOCUMENTS

6,286,092 B1   9/2001  Frank
2003/0123286 A1*  7/2003  Higuchi .............. G06F 11/1024
                                                                  365/185.09
2011/0072189 A1   3/2011  Post
(Continued)

*Primary Examiner* — Arpan P. Savla
*Assistant Examiner* — Edmund H Kwong
(74) *Attorney, Agent, or Firm* — Morgan, Lewis & Bockius LLP (57) ABSTRACT

The subject technology provides for managing a data storage system. A host write command to write host data associated with a logical address to a non-volatile memory is received. A first physical address in the non-volatile memory mapped to the logical address in an address mapping table is determined. An indicator that the first physical address is bad checked. If the first physical address is indicated as bad, a valid count associated with a first set of physical addresses at a current value is maintained. The first set of physical addresses comprises the first physical address. If the first physical address is not indicated as bad, the first physical address is marked as invalid. The valid count associated with the first set of physical addresses is decremented.

20 Claims, 5 Drawing Sheets

(52) U.S. Cl.
CPC ............ *G06F 2212/7205* (2013.01); *G06F 2212/7211* (2013.01)

(56) References Cited

U.S. PATENT DOCUMENTS

| | | | |
|---|---|---|---|
| 2014/0006688 A1* | 1/2014 | Yu | G11C 16/10 365/185.03 |
| 2014/0237286 A1 | 8/2014 | Jung | |
| 2016/0179386 A1 | 6/2016 | Zhang | |
| 2016/0239375 A1 | 8/2016 | Fee | |
| 2017/0160960 A1* | 6/2017 | Camp | G06F 3/0616 |
| 2018/0307431 A1 | 10/2018 | Gunnam | |

* cited by examiner

| AB0 | BB0 | CB0 | DB0 | | AB1 | BB1 | CB1 | DB1 |
|-----|-----|-----|-----|---|-----|-----|-----|-----|
| 0   | 0   | 0   | 1   |   | 0   | 0   | 0   | 0   |

Bit Mask

MANAGING DATA FOR A DATA STORAGE SYSTEM

CROSS-REFERENCE TO RELATED APPLICATIONS

This application is a continuation of application Ser. No. 16/523,956, filed on Jul. 26, 2019, now U.S. Pat. No. 10,901,632, which is a continuation of application Ser. No. 15/664,667, filed on Jul. 31, 2017, now U.S. Pat. No. 10,379,758, which claims the benefit of U.S. Provisional Application No. 62/525,128, filed on Jun. 26, 2017, the entirety of each of which is incorporated herein by reference for all purposes.

BACKGROUND

The present disclosure relates generally to managing system data for a data storage system.

Data storage systems, such as solid state drives (SSD), maintain system data for managing operations and performance in the data storage systems. In addition to processing host commands, data storage systems perform maintenance operations that may include internal data movement operations. However, read failures during maintenance operations can make maintaining accurate system data difficult.

SUMMARY

Aspects of the subject technology relate to a method for managing a data storage system. The method may include receiving a host write command to write host data associated with a logical address to a non-volatile memory. The method may also include determining a first physical address in the non-volatile memory mapped to the logical address in an address mapping table. The method may further include checking for an indicator that the first physical address is bad. The method may also include if the first physical address is indicated as bad, maintaining a valid count associated with a first set of physical addresses at a current value, wherein the first set of physical addresses comprises the first physical address. The method may include if the first physical address is not indicated as bad, marking the first physical address as invalid and decrementing the valid count associated with the first set of physical addresses.

In certain aspects, the subject technology also relates to a data storage system is provided. The data storage system may include means for receiving a host write command to write host data associated with a logical address to a non-volatile memory. The data storage system may also include means for determining a first physical address in the non-volatile memory mapped to the logical address in an address mapping table. The data storage system may also include means for checking for an indicator that the first physical address is bad. The data storage system may further include if the first physical address is indicated as bad, means for maintaining a valid count associated with a first set of physical addresses at a current value, wherein the first set of physical addresses comprises the first physical address. The data storage system may further include if the first physical address is not indicated as bad, means for marking the first physical address as invalid and decrementing the valid count associated with the first set of physical addresses.

Aspects of the subject technology also relate to a data storage system including a plurality of storage devices, each storage device comprising a plurality of non-volatile memory die, and a controller coupled to the plurality of storage devices. The controller may be configured to receive a host write command to write host data associated with a logical address to a non-volatile memory. The controller may also be configured to determine a first physical address in the non-volatile memory mapped to the logical address in an address mapping table. The controller may further be configured to check for an indicator that the first physical address is bad. The controller may be configured to if the first physical address is indicated as bad, maintain a valid count associated with a first set of physical addresses at a current value, wherein the first set of physical addresses comprises the first physical address. The controller may also be configured to if the first physical address is not indicated as bad, mark the first physical address as invalid and decrementing the valid count associated with the first set of physical addresses. The controller may further be configured to initiate a write operation to write the host data associated with the logical address to a second physical address in the non-volatile memory. The controller may further be configured to update the address mapping table to map the logical address to the second physical address.

It is understood that other configurations of the present disclosure will become readily apparent to those skilled in the art from the following detailed description, wherein various configurations of the present disclosure are shown and described by way of illustration. As will be realized, the present disclosure is capable of other and different configurations and its several details are capable of modification in various other respects, all without departing from the scope of the present disclosure. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent that the subject technology may be practiced without these specific details. In some instances, structures and components are shown in block diagram form in order to avoid obscuring the concepts of the subject technology. Like components are labeled with identical element numbers for ease of understanding.

Controllers manage data storage devices, such as solid state drives (SSD), and execute data operations in non-volatile memory, such as NAND flash memory, of the data storage devices. Controllers maintain mapping tables to keep track of physical addresses and logical addresses associated with data transmitted from host systems. Mapping tables map logical addresses to respective physical addresses in non-volatile memory of the data storage system. Logical addresses are assigned to respective data transmitted from host systems to data storage devices. Controllers may update the mapping tables when data is relocated to another physical address in the data storage system. Controllers may reference the mapping tables to write data to and to read data from non-volatile memory based on host commands. Controllers may also maintain validity tables for keeping track of the amount of valid data stored in blocks of non-volatile memory. Validity tables may be used to select blocks for garbage collection based on the amount of valid data indicated in the tables.

When controllers perform internal data movement operations (e.g., garbage collection, data relocation, wear leveling), controllers update mapping tables and validity tables according to the data movement. When data is written to non-volatile memory, metadata that includes the data's logical address may be stored in the non-volatile memory along with the data. Controllers may utilize the logical address information in the metadata to update mapping tables to reflect the internal data movement. However, when a read failure occurs during internal data movement, the metadata of the data cannot be read and the logical address information associated with the data is lost. Without the logical address included in the metadata of the data, updating the mapping table may not be completed, leaving a logical address mapped to a bad physical address in the mapping table. The subject technology improves performance of data storage systems, for example, by recognizing "bad" pages and updating system data according to the processes described herein.

Figure 1:
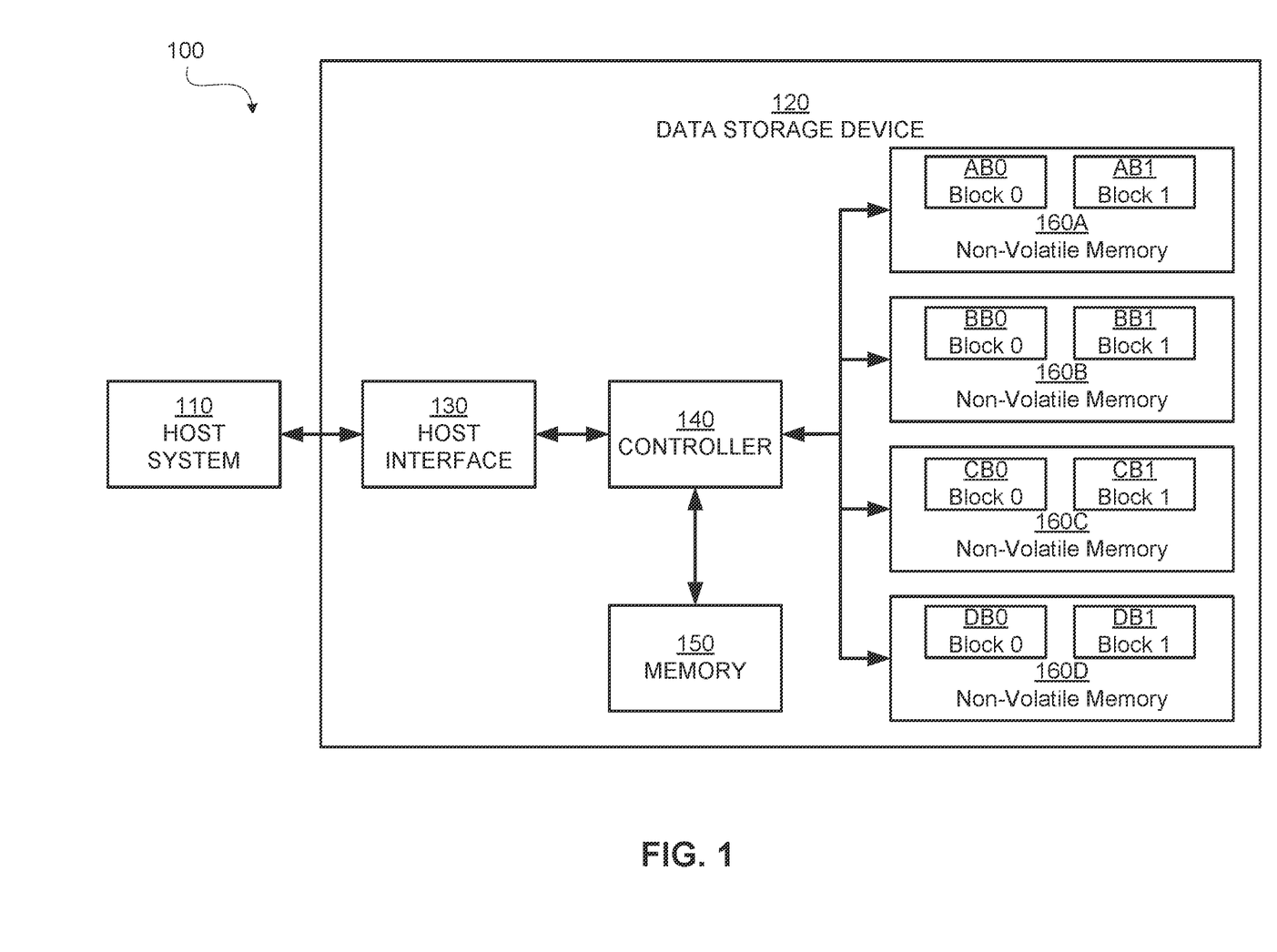
FIG. 1 is a block diagram depicting components of a data storage system according to aspects of the subject technology.

FIG. 1 is a block diagram depicting components of an example data storage system 100 according to various implementations of the subject technology. Data storage system 100 may include host system 110 and data storage device 120. Data storage device 120 (for example, a solid state drive) may include host interface 130, controller 140, memory 150, and non-volatile memory devices 160A-160D.

Host system 110 represents a device configured to be coupled to data storage system 120, to send data to and receive data from data storage system 120 via host interface 130. Host system 110 may be a computing system such as a personal computer, a server, a workstation, a laptop computer, PDA, smart phone, and the like. Alternatively, host system 110 may be an electronic device such as a digital camera, a digital audio player, a digital video recorder, and the like.

Host interface 130 may include both electrical and physical connections for operably coupling host system 110 to controller 140. Host interface 130 may be configured to communicate data, addresses, and control signals between host system 110 and controller 140. Host interface 130 may use any proprietary or standard interface protocols including, but not limited to, Serial Advanced Technology Attachment (SATA), Advanced Technology Attachment (ATA), Small Computer System Interface (SCSI), PCI-extended (PCI-X), Fibre Channel, Serial Attached SCSI (SAS), Secure Digital (SD), Embedded Multi-Media Card (EMMC), Universal Flash Storage (UFS), and Peripheral Component Interconnect Express (PCIe).

According to aspects of the subject technology, host interface 130 may implement a wireless connection between host system 110 and data storage device 120 using standardized or proprietary wireless interface standards and protocols. In this regard, host interface 130 or other components of data storage device 120 may include a wireless transceiver to place host system 110 and data storage device 120 in wireless communication with each other.

Controller 140 is configured to store data received from host system 110 in non-volatile memory devices 160A-160D in response to a write command from host system 110, and to read data stored in non-volatile memory devices 160A-160D and to transfer the read data to host system 110 via host interface 130 in response to a read command from host system 110. Controller 140 may include several internal components (not shown in FIG. 1) such as multiple processor cores, memory, a flash component interface (for example, a multiplexer to manage instruction and data transport along a connection to non-volatile memory devices 160A-160D), an I/O interface, error correction code (ECC) module, and the like. The ECC module may be configured to generate code words to be stored in non-volatile memory devices 160A-160D from data received from host system 110 and to decode code words read from non-volatile memory devices 160A-160D before sending the decoded data to the host system 110. Various ECC solutions may be used to encode and decode data to generate the code words. In some aspects, one or more elements of controller 140 may be integrated into a single chip. In other aspects, the elements may be implemented on multiple discrete components.

Controller 140 may include a multi-core processor. For example, respective cores in the multi-core processor may be assigned to separate processes. Controller 140, for example, may be configured to execute code or instructions to manage operation command flow and address mappings and to perform calculations and generate operation commands. The controller 140 may be configured to monitor and control the operation of the components in the data storage device 120. Controller 140 may include a general-purpose microprocessor, a microcontroller, a digital signal processor (DSP), an application specific integrated circuit (ASIC), a field programmable gate array (FPGA), a programmable logic device (PLD), a state machine, gated logic, discrete hardware components, or a combination of the foregoing.

Sequences of instructions may be stored as firmware in memory within controller 140. Sequences of instructions also may be stored and read from memory 150, non-volatile memory devices 160A-160D, or received from host system 110 (for example, via a host interface 130). Memory 150 and non-volatile memory devices 160A-160D represent examples of machine or computer readable media on which instructions/code executable by controller 140 may be stored. Machine or computer readable media may generally refer to any tangible and non-transitory media used to provide instructions to controller 140, its processor, including both volatile media, such as dynamic memory used for memory 150 or for buffers within controller 140, and non-volatile media, such as electronic media, optical media, and magnetic media.

Controller 140 may use memory 150 for temporary storage of data and information used to manage data storage device 120. In some aspects, memory 150 represents volatile memory used to temporarily store data and information used to manage data storage device 120. According to aspects of the subject technology, memory 150 may be random access memory (RAM) such as double data rate (DDR) RAM. Other types of RAM also may be used to implement memory 150. Memory 150 may be implemented using a single RAM module or multiple RAM modules. While memory 150 is depicted as being distinct from controller 140, memory 150 may be incorporated into controller 140 without departing from the scope of the present disclosure. Alternatively, memory 150 may be non-volatile memory such as a magnetic disk, flash memory, and the like.

Non-volatile memory devices 160A-160D represent non-volatile memory devices for storing data. The number of non-volatile memory devices in data storage device 120 may be any number such as two, four, eight, sixteen, etc. For simplicity of discussion, four non-volatile memory devices 160A-160D are depicted in FIG. 1. Non-volatile memory devices 160A-160D are not limited to any particular capacity or configuration. For simplicity of discussion, FIG. 1 depicts each of non-volatile memory devices 160A-160D being organized into two blocks (e.g., Block 0 and Block 1). For example, non-volatile memory device 160A includes Block 0 (e.g., AB0) and Block 1 (e.g., AB1), non-volatile memory device 160B includes Block 0 (e.g., BB0) and Block 1 (e.g., BB1), non-volatile memory device 160C includes Block 0 (e.g., CB0) and Block 1 (e.g., CB1), and non-volatile memory device 160D includes Block 0 (e.g., DB0) and Block 1 (e.g., DB1). Each block may include a number of pages, for example 256, and each page may contain one or more sectors or portions of data. The number of non-volatile memory devices per data storage device, the number of blocks per non-volatile memory device, the number of pages per block, the number of sectors per page, and/or the size of the sectors are not limited to the numbers depicted in FIG. 1.

The blocks of non-volatile memory devices 160A-160D may be organized into logical units called blocksets. Each blockset may include a block from each of the non-volatile memory devices 160A-160D. For example, a blockset 0 may include blocks AB0, BB0, CB0, and DB0. Similarly, a blockset 1 may include blocks AB1, BB1, CM, and DB1. Each of the blocks in a blockset may have a common physical address within their respective non-volatile memory devices. Controller 140 may manage write and erase operations using blocksets. For example, controller 140 may write data sequentially to pages and blocks within a blockset until the blockset is full before starting to write data to pages and blocks in a next available blockset. With respect to erase operations, controller 140 may erase all blocks in a blockset when erasing data during internal data movement operations or in response to an erase command received from host system 110.

According to aspects of the subject technology, non-volatile memory devices 160A-160D include, for example, NAND flash memory. Non-volatile memory devices 160A-160D may comprise multilevel cell (MLC) flash memory and/or three-level cell (TLC) flash memory, for example. In some aspects non-volatile memory devices 160A-160D may further comprise three-dimensional (3D) flash memory. In some aspects, non-volatile memory devices 160A-160D may comprise one or more hybrid memory devices that can function in one or more of a SLC, MLC, or TLC mode. The subject technology is not limited to these types of memory and may be applied to flash memory cells configured and operated using more than three levels (e.g., 4 bits per cell, 5 bits per cell, etc.).

Figure 2A:
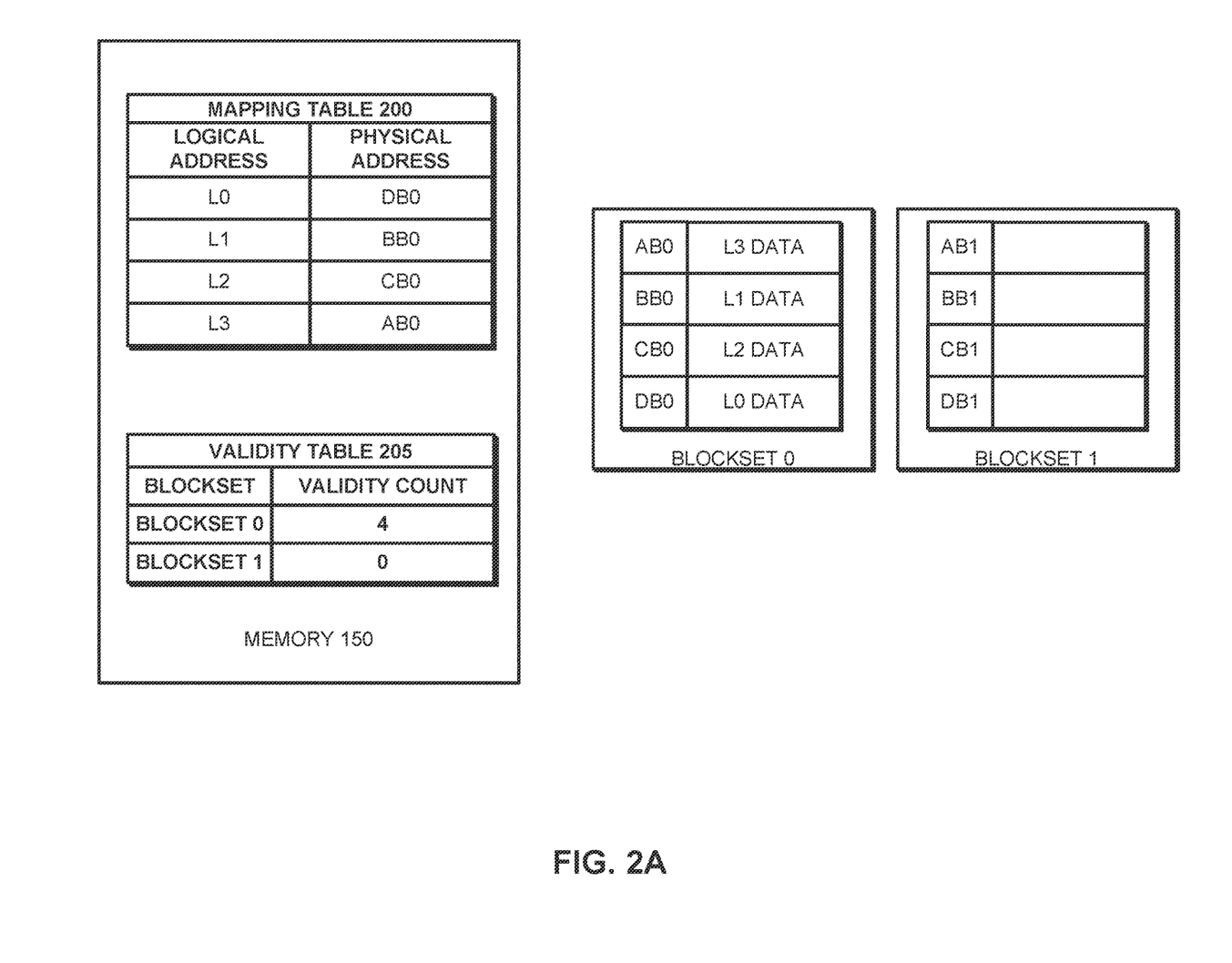
FIGS. 2A and 2B are conceptual view depicting example mapping table and validity table according to aspects of the subject technology.

FIG. 2A is conceptual view depicting example mapping table 200 and validity table 205 according to aspects of the subject technology. Host system 110 may send data commands (e.g., host write commands, host read commands) to data storage device 120. Data commands may be associated with logical addresses. When host write commands are received in data storage device 120, controller 140 may select physical addresses of memory locations in non-volatile memory devices 160A-160D for writing data of the received host write command. Controller 140 may map the selected physical addresses to the logical addresses associated with the host write commands in mapping table 200.

Mapping table 200 may be stored in memory 150 and may be accessible by controller 140. Mapping table 200 may include logical addresses (e.g., logical addresses L0-L3) used by host system 110 in data commands. Mapping table 200 may be indexed by the logical addresses. Mapping table 200 may include physical addresses non-volatile memory devices 160A-160D mapped to corresponding logical addresses L0-L3. For example, host system 110 may send a data command to write data associated with logical address L0. In response to the data command, controller 140 of data storage device 120 selects a page in block DB0 and writes the data of L0 to the page in block DB0 of non-volatile memory devices 160A. Block DB0 may now include data of L0 (e.g., L0 data). Controller 140 may map physical address of block DB0 to logical address L0 in mapping table 200. Referencing other entries in mapping table 200, block AB0 includes data associated with logical address L3, block BB0 includes data associated with logical address L1, and block CB0 includes data associated with logical address L2.

To simplify the discussion herein, the physical addresses illustrated in mapping table 200 of FIG. 2A indicate a physical block (e.g., DB0, BB0, CB0, AB0) mapped to a respective logical address associated with the data stored in the physical block. The physical addresses mapped to logical addresses in mapping table 200 may further include a physical page address corresponding to a page within the physical block, an offset indicating a portion of the physical page, and/or other divisions of physical memory to which the data associated with the mapped logical address is written.

Validity table 205 may be stored in memory 150 and may be accessible by controller 140. Validity table 205 may indicate validity counts that represent the number of physical pages in a respective block or blockset that contain valid data. For purposes of this description, each block will treated as containing a single page. Referencing FIG. 2A, each block in blockset 0 of non-volatile memory devices 160A is shown as containing valid data, and thus validity table 205 may indicate the validity count of four (4) for blockset 0. Blocks of blockset 1 of non-volatile memory devices 160A-160D, on the other hand, do not include data, and thus, validity table 205 may indicate the validity count of zero (0) for blockset 1. Validity table 205 may be used to select blocks for garbage collection. For example, when blocks within non-volatile memory devices 160A-160D need to be freed up for future write operations, controller 140 may reference validity table 205 to select a blockset with a validity count below a threshold or a blockset with the lowest validity count to execute garbage collection. As the data stored in pages and blocks is invalidated during operation of data storage device 120, the validity counts associated with the impacted pages and blocks are decremented. If a validity count is decremented to zero, controller 140 may automatically designate that block or blockset for erasure.

Figure 2B:
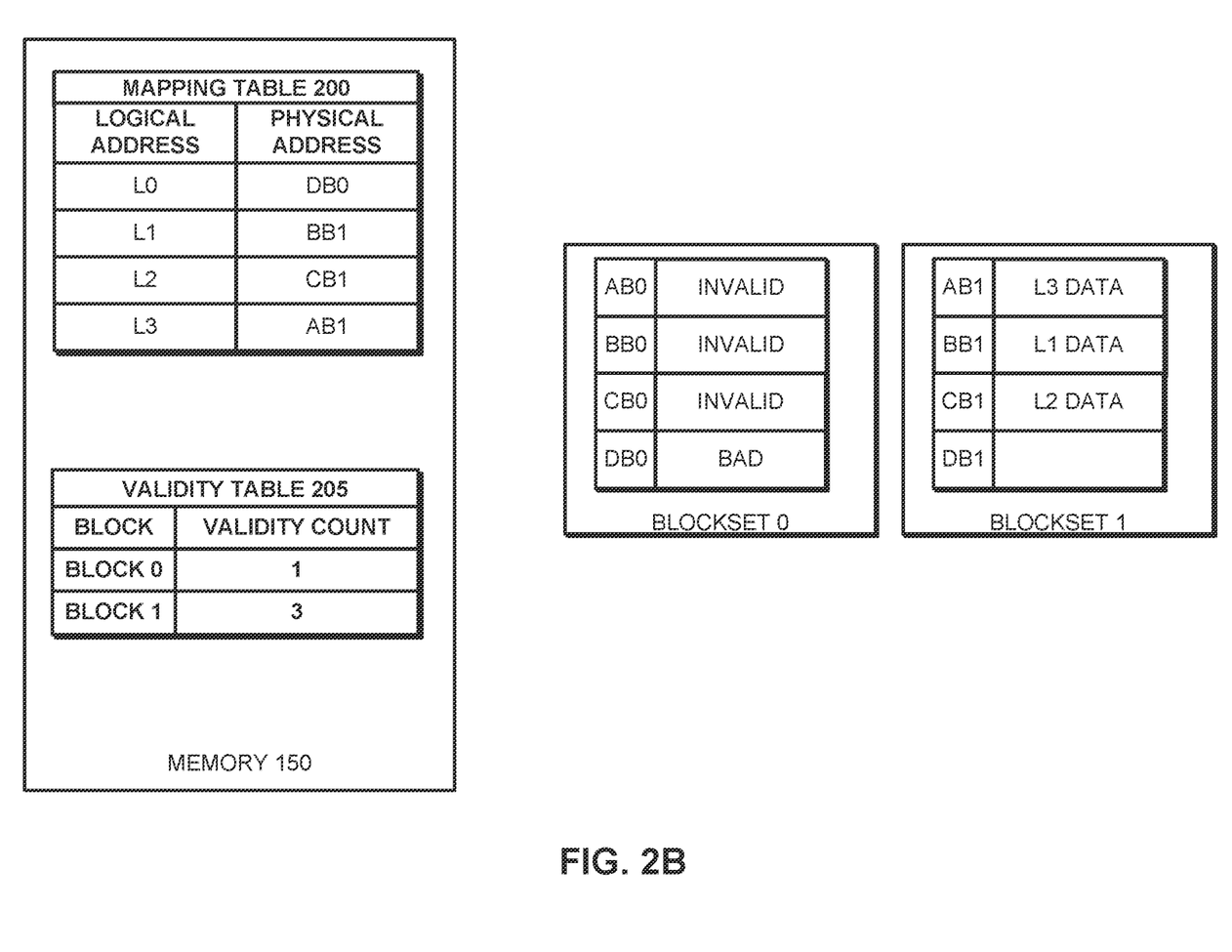

FIG. 2B is conceptual view depicting example mapping table 200 and validity table 205 according to aspects of the subject technology. Controller 140 may perform internal data movement (e.g., garbage collection, wear-levelling) in non-volatile memory devices 160A-160D to move valid data stored in blockset 0 to blockset 1. For example, during the internal data movement, controller 140 may read the data stored in each of blocks AB0, BB0, CB0, and DB0 so that the data may be written to blocks of blockset 1. After reading the data from a particular block, controller 140 may determine the logical address associated with the read data from the metadata stored in the block. For example, controller 140 may read block AB0 in which L3 data is stored, and determine a logical address (e.g., logical address L3) associated with L3 data based on metadata stored in block AB0. Based on the determined logical address L3 and after writing the read data to block AB1, controller 140 may update mapping table 200 by updating physical address mapped to logical address L3 in mapping table 200 from block AB0 to block AB1.

When L3 data is successfully read from block AB0 of blockset 0, controller 140 may mark block AB0 as "invalid." When block AB0 is marked "invalid," controller 140 may decrement the validity count of blockset 0. Similarly, controller 140 may read L1 data stored in block BB0 of blockset 0, and move L1 data to block BB1 of blockset 1. Controller 140 may read L2 data stored in block CB0 of blockset 0, and move L2 data to block CB1 of blockset 1. Accordingly, when L3 data, L1 data, and L2 data are internally moved from blockset 0 to blockset 1, blocks AB0, BB0, and CB0 of blockset 0 may be marked "invalid." Mapping table 200 may be updated with block BB1 mapped to logical address L1, block CB1 mapped to logical address L2, and block AB1 mapped to logical address L3. Validity count for blockset 0 in validity table 205 may be reduced to one.

During the internal data movement, controller 140 may experience a read failure when trying to read L0 data stored in block DB0 of blockset 0. For example, when controller 140 execute a read operation in non-volatile memory devices 160D to read L0 data, non-volatile memory device 160D may return an error indicating uncorrectable read failure to controller 140. Because controller 140 is unable to read the data stored in block DB0, metadata that includes logical address information associated with L0 data is not available to controller 140. Accordingly, controller 140 may not be able to determine the logical address of L0 data, and therefore unable to update the L0 entry in mapping table 205. As such, mapping table 200 may still indicate data associated with logical address L0 is stored in physical address of block DB0. Controller 140 may mark block DB0 in which read failure occurred as "bad." For example, a read failure event may be used as an indication of a bad memory location that the controller marks as bad to remove block DB0 from use for future data operations in the system.

According to aspects of the subject technology, controller 140 may maintain the validity count for blockset 0 at a current value (e.g., one) when a read failure occurs during an internal data movement operation. Maintaining the validity count when a read failure occurs during internal data movement operations allows the validity counts to maintain accuracy when being adjusted by controller 140 during host data operations. For example, when host system 110 issues a write command to overwrite data already written to data storage device 120, controller 140 references mapping table 200 using the logical address used by host system 110 to determine the physical address of the previously written data, marks the physical address as invalid and decrements the validity count for the block or blockset containing that physical address. In the example described above where a read failure occurred while trying to read block DB0, controller 140 may have subsequently erased blockset 0 and written new data to one or more of the blocks of blockset 0. However, due to the read failure, the mapping of logical address L0 in mapping table 200 could not be updated and logical address L0 in the mapping table is considered to be orphaned since the mapping no longer reflects the location of data associated with logical address L0. If the validity count for blockset 0 is decremented due to the read failure during the internal data movement and decremented again upon receiving a host write command for data associated with logical address L0, the validity count could be decremented twice for the same physical memory location and potentially trigger a premature erase operation if controller 140 interprets the current validity count as being zero when in fact a valid page or block in the blockset may still be present.

Figure 3:
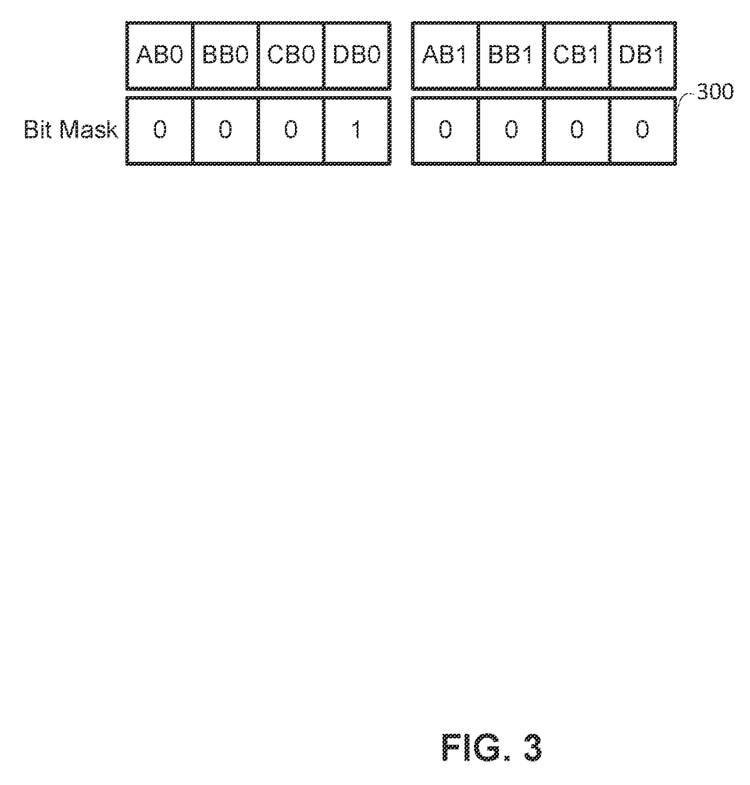
FIG. 3 is conceptual view depicting an example bit mask according to aspects of the subject technology.

FIG. 3 is conceptual view depicting an example bit mask 300 according to aspects of the subject technology. Controller 140 may utilize a bit mask 300 to keep track of blocks marked as "bad" in blocksets. For example, when controller 140 determines that a block (e.g., block DB0) is "bad," controller 140 may set a bit associated with the block to "1" in a bit in bit mask 300. In some aspects, controller 140 may set bits that correspond to "bad" block to "0." Controller 140 may maintain bit masks in memory 150. Bits in the bit masks may represent respective pages, blocks, or blocksets in non-volatile memory devices 160A-160D in storage device 120.

Figure 4:
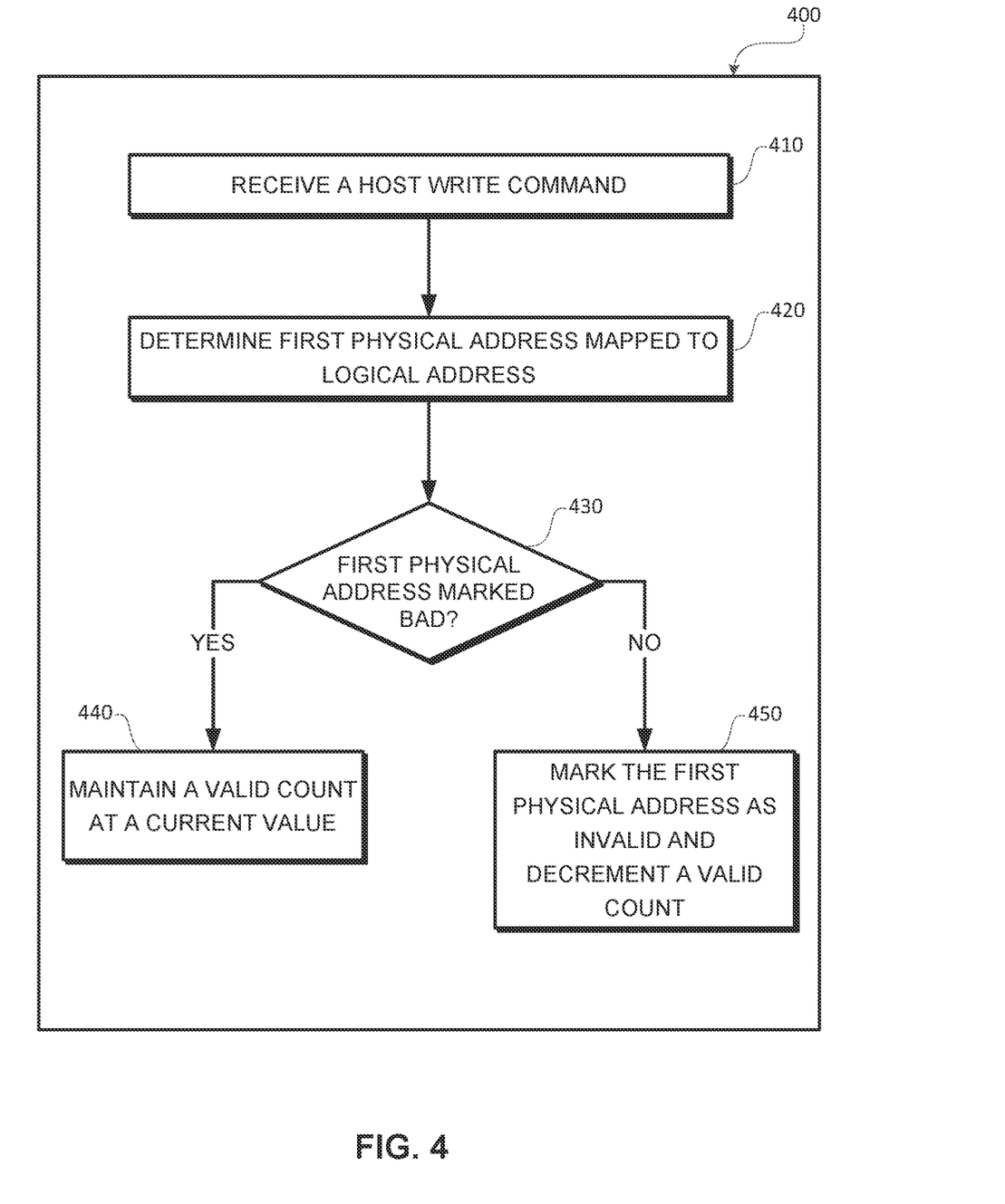
FIG. 4 depicts a flow diagram of an example process for managing system data in data storage system according to aspects of the subject technology.

FIG. 4 depicts a flow diagram of an example process for managing system data in data storage system 120 according to aspects of the subject technology. For explanatory purposes, the various blocks of example process 400 are described herein with reference to the components and/or processes described herein. The one or more of the blocks of process 400 may be implemented, for example, by one or more components or processors of controller 140 of FIG. 1. In some implementations, one or more of the blocks may be implemented apart from other blocks, and by one or more different processors or controllers. Further for explanatory purposes, the blocks of example process 400 are described as occurring in serial, or linearly. However, multiple blocks of example process 400 may occur in parallel. In addition, the blocks of example process 400 need not be performed in the order shown and/or one or more of the blocks of example process 400 need not be performed.

At block 410, controller 140 receives a host write command associated with a logical address from host system 110 via host interface 130. For example, the host write command may be associated with logical address L0. At block 420, controller 140 determines a first physical address in non-volatile memory devices 160A-160D mapped to the logical address based on a mapping table. For example, controller 140 looks up logical address L0 in mapping table 200 and determines physical address of block DB0 of blockset 0 is mapped to logical address L0.

At block 430, controller 140 checks for an indicator that the first physical address is bad. For example, controller 140 checks a bit in bit mask 300 associated with block DB0 to determine whether the bit indicates block DB0 as "bad." If the bit indicates block DB0 as "bad" (block 430=YES), process 400 proceeds to block 440 where a valid count associated with a block that includes the first physical address is maintained at a current value. For example, if the bit in bit mask 300 indicates that block DB0 is marked "bad," controller 140 does not decrement the validity count for blockset 0 and maintains the current value of the validity count. Otherwise, if the bit does not indicate block DB0 as "bad" (block 430=NO), process 400 proceeds to block 450 where controller 140 marks the first physical address as "invalid" and decrements the validity count associated with the block since data stored in block DB0 is being relocated to a different physical address. For example, if the bit in bit mask 300 indicates that block DB0 is not marked "bad," controller 140 marks block DB0 as "invalid" and decrements the validity count for blockset 0. Controller 140 may also update mapping table 200 to remove the mapping between logical address L0 and physical address of block DB0.

It is understood that illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is presented as an illustration of some exemplary approaches. Based upon design preferences and/or other considerations, it is understood that the specific order or hierarchy of steps in the processes may be rearranged. For example, in some implementations some of the steps may be performed simultaneously. Thus the accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to," "operable to," and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

The phrases "in communication with" and "coupled" mean in direct communication with or in indirect communication with via one or more components named or unnamed herein (e.g., a memory card reader).

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an implementation may apply to all aspects, or one or more aspects. An implementation may provide one or more examples. A phrase such as an "embodiment" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A machine-implemented method, comprising:
   obtaining a data operation request for data associated with a logical address;
   determining a first physical address, in a non-volatile memory, mapped to the logical address, wherein the first physical address is associated with a first set of physical addresses, and wherein the first set of physical addresses is associated with a first indicator value;
   determining whether the first physical address is indicated as bad, wherein an indication as bad represents a failed operation;
   in response to the first physical address being indicated as bad, maintaining the first indicator value associated with the first set of physical addresses and not updating the first indicator value; and
   in response to the first physical address being not indicated as bad, changing the first indicator value associated with the first set of physical addresses and removing a mapping between the logical address and the first physical address.

2. The machine-implemented method of claim 1, wherein determining whether the first physical address is indicated as bad comprises determining whether the first physical address is indicated as bad based on an indication in a bit mask.

3. The machine-implemented method of claim 2, comprising verifying a bit corresponding to the first physical address in the bit mask, wherein the first physical address is indicated as bad when the bit is set.

4. The machine-implemented method of claim 3, comprising setting the bit in the bit mask in response to an error occurring during a read operation to read data written to the first physical address.

5. The machine-implemented method of claim 1, comprising:
   performing a write operation to write data associated with the logical address to a second physical address in the non-volatile memory, wherein the write operation writes metadata comprising the logical address to the second physical address; and
   facilitating mapping between the logical address and the second physical address.

6. The machine-implemented method of claim 1, comprising:
   determining that the first indicator value associated with the first set of physical addresses is zero; and
   designating the first set of physical addresses for erase operations.

7. The machine-implemented method of claim 1, wherein the non-volatile memory comprises a plurality of non-volatile memory devices, and wherein the first set of physical addresses comprises a respective physical address in each of the plurality of non-volatile memory devices.

8. A data storage system, comprising:
   a non-volatile memory; and
   one or more controllers configured to cause:
   obtaining a data operation request for data associated with a logical address;
   determining a first physical address, in the non-volatile memory, mapped to the logical address, wherein the first physical address is associated with a first set of physical addresses, and wherein the first set of physical addresses is associated with a first indicator value;
   determining whether the first physical address is indicated as bad, wherein an indication as bad represents a failed operation;
   in response to the first physical address being indicated as bad, maintaining the first indicator value associated with the first set of physical addresses and not updating the first indicator value; and
   in response to the first physical address being not indicated as bad, changing the first indicator value associated with the first set of physical addresses and removing a mapping between the logical address and the first physical address.

9. The data storage system of claim 8, wherein determining whether the first physical address is indicated as bad comprises determining whether the first physical address is indicated as bad based on an indication in a bit mask.

10. The data storage system of claim 9, wherein the one or more controllers are configured to cause verifying a bit corresponding to the first physical address in the bit mask, wherein the first physical address is indicated as bad when the bit is set.

11. The data storage system of claim 10, wherein the one or more controllers are configured to cause setting the bit in the bit mask in response to an error occurring during a read operation to read data written to the first physical address.

12. The data storage system of claim 8, wherein the one or more controllers are configured to cause performing a write operation to write data associated with the logical address to a second physical address in the non-volatile memory, wherein the write operation writes metadata comprising the logical address to the second physical address; and
   facilitating mapping between the logical address and the second physical address.

13. The data storage system of claim 8, wherein the one or more controllers are configured to cause:
   determining that the first indicator value associated with the first set of physical addresses is zero; and
   designating the first set of physical addresses for erase operations.

14. The data storage system of claim 8, wherein the non-volatile memory comprises a plurality of non-volatile memory devices, and wherein the first set of physical addresses comprises a respective physical address in each of the plurality of non-volatile memory devices.

15. An apparatus, comprising:
   means for obtaining a data operation request for data associated with a logical address;
   means for determining a first physical address, in a non-volatile memory, mapped to the logical address, wherein the first physical address is associated with a first set of physical addresses, and wherein the first set of physical addresses is associated with a first indicator value;
   means for determining whether the first physical address is indicated as bad, wherein an indication as bad represents a failed operation;
   means for, in response to the first physical address being indicated as bad, maintaining the first indicator value associated with the first set of physical addresses and not updating the first indicator value; and
   means for, in response to the first physical address being not indicated as bad, changing the first indicator value associated with the first set of physical addresses and removing a mapping between the logical address and the first physical address.

16. The apparatus of claim 15, wherein the means for determining whether the first physical address is indicated as bad comprises means for determining whether the first physical address is indicated as bad based on an indication in a bit mask.

17. The apparatus of claim 16, comprising means for verifying a bit corresponding to the first physical address in the bit mask, wherein the first physical address is indicated as bad when the bit is set.

18. The apparatus of claim 17, comprising means for setting the bit in the bit mask in response to an error occurring during a read operation to read data written to the first physical address.

19. The apparatus of claim 15, comprising:
   means for performing a write operation to write data associated with the logical address to a second physical address in the non-volatile memory, wherein the write operation writes metadata comprising the logical address to the second physical address; and
   means for facilitating mapping between the logical address and the second physical address.

20. The apparatus of claim 15, comprising:
   means for detecting that the first indicator value associated with the first set of physical addresses is zero; and
   means for selecting the first set of physical addresses for erase operations.

\* \* \* \* \*